3,459,913
STEERING POST MOUNTED AUTOMOTIVE VEHICLE LAMP CONTROL SWITCH WITH SLIDABLY ADJUSTABLE CONTACT CONTROL CAMMING AND LOCATING MEANS
Erich Mutschler, Bietigheim, and Franz Schreiber, Kirchheim (Neckar), Germany, assignors to SWF-Specialfabrik fur Autozubehor Gustav Rau G.m.b.H., Bietigheim, Germany
Filed Mar. 15, 1967, Ser. No. 623,273
Claims priority, application Germany, May 13, 1966, S 103,783
Int. Cl. H01h 3/04
U.S. Cl. 200—166  10 Claims

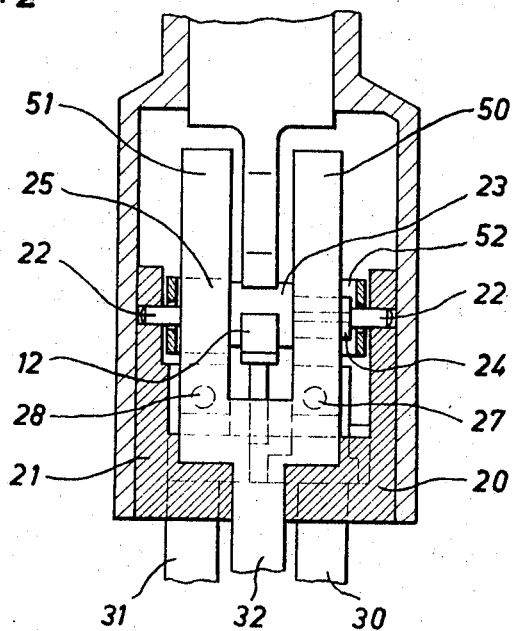
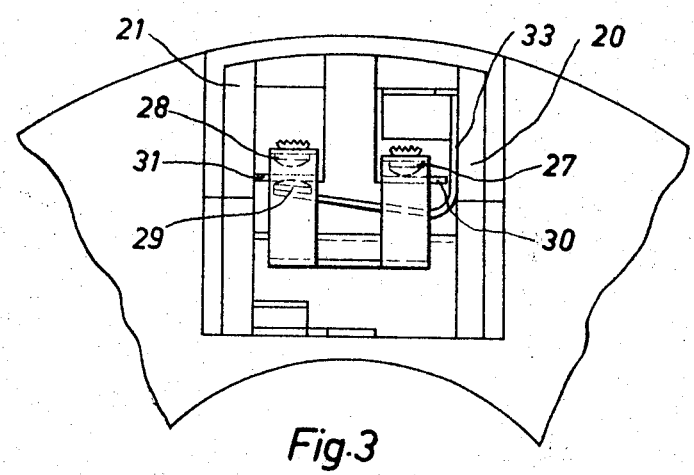

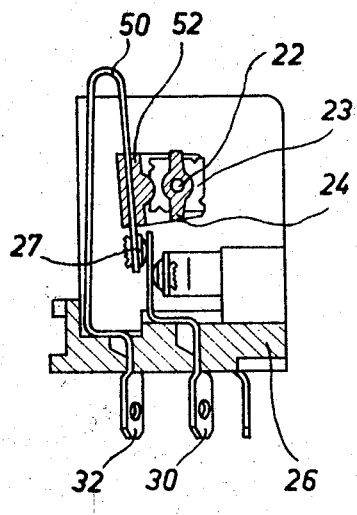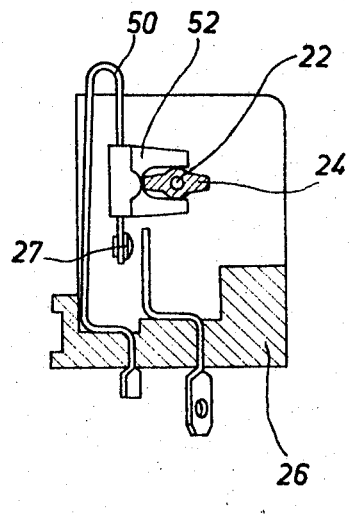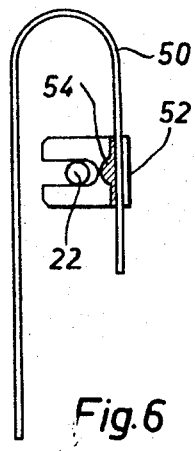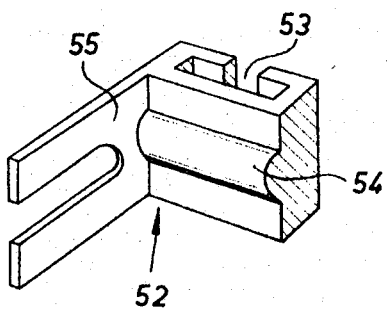

ABSTRACT OF THE DISCLOSURE

This is an improvement in a steering column mounted automotive vehicle lamp control switch having a lever oscillatable to signal turns and an operating member swingable by the lever and operable, on each complete swing, to switch head lamps between high beam and low beam and having an intermediate position for flashing the high beam head lamps. In each cycle of oscillation of the operating member, a square switch cam is rotated 90° and releasably latched. The switch cam is secured to a shaft and a pair of control cams are also secured to the shaft. One control beam controls a switch in the high beam head lamp circuit and the other controls a switch in the low beam head lamp circuit, the control cams being displaced by an angle of 90°. An abutment on the operating member normally maintains a third switch open. When the operating member is moved to an intermediate position, the third switch closes a circuit for the high beam head lamps and which by-passes the usual on-off head lamp switch. The improvement includes a pair of contact control parts each freely slidable longitudinally along a free leg of a respective one of a pair of U-shaped contact springs. Each control part includes a bifurcated arm for embracing a shaft to locate the associated control part. Each control part is formed with a transverse protrusion engageable by the associated control cam.

Cross reference to related application

The present invention is directed to a switch construction which is an improvement on the switch construction shown, described and claimed in U.S. patent application Ser. No. 550,363 in which the sole applicant is one of the present applicants.

Background of the invention

This invention relates to switches for controlling automotive vehicle lamps and, more particularly, to an improved switch construction of the type mounted on the steering column of the automotive vehicle for oscillation of a control lever about an axis to signal a projected change in direction of the vehicle and further operable to select either high beam or low beam operation of the headlamps as well as to "flick" the high beam headlamps off and on and independently of the usual headlamp on-off switch.

There are known prior art switches of this type, designed as steering column switches. These known prior art switches utilize separate metal leaf springs, in the form of pushbuttons, and these are mounted in the switch housing and serve for switching and securing or holding in position two cams arranged at 90° angles with respect to each other and actuating alternately two different contacts. With this known prior art construction, the installation of the leaf spring into the pushbutton has to be carried out with a great deal of care because readjustment after assembly of the switch is no longer possible. Furthermore, the tolerances due to assembly line manufacture of these prior art switches are effective in an unfavorable manner thereon.

In the mentioned copending application, the construction of such switches is improved by arranging the switch at the inner or free end of the actuating lever or operating member, and constructing the operating member and resilient switch elements, as well as a switching abutment or nose on one element, in one piece of an elastic material, such as a synthetic resin material selected from the group of polyamides. The switch elements are constructed as relatively thin and flat leaf springs which extend parallel to each other and in mutually opposed directions, these springs having their free ends extending in the direction of movement of the operating member which is pivotally supported at its upper end in the switch housing. The lower leaf spring is provided with a pawl-shaped stop or abutment and constitutes a switch arm. The upper leaf spring constitutes a retainer arm and is spaced from the switch arm by a distance which is not greater than, and preferably less than, the length of a side of a square switching or trip cam.

In addition, the lower switch arm is provided with a web-shaped switching projection or nose portion extending perpendicularly therefrom and effective to operate an additional contact controlling an independent energizing circuit for the high beams of the headlamps. This independent energizing circuit bypasses the usual headlamps on-off switch. The upper and lower leaf springs engage opposite edge surfaces of the square switch cam so as to retain the switch or trip cam in an operative position until the next oscillation of the switch operating member. In order to improve the assembly and adjustment of the switch parts, all of the contacts and cams are mounted on a base plate and properly adjusted prior to installation into the steering column housing.

In the construction of the switch disclosed in the mentioned copending U.S. patent application, the two switch contacts operated by the control cams are in the form of U-shaped leaf springs, and each leaf spring has a free leg which is formed with an undulation which is convex toward the mounting axis or shaft of the switch and control cams and arranged to be engaged by the respective control cam. Difficulty has been experienced in properly mounting these U-shaped leaf springs so that the undulation is directly in line with the associated control cam. Furthermore, asembly of the contact springs has been found to be very difficult and time consuming.

Summary of the invention

The present invention is directed to a switch construction of the type shown, described and claimed in the mentioned copending application, but which includes several improvements over this latter switch construction. As one feature, the undulated bulge on the free arm of each U-shaped spring, these springs being mounted in the switch base and carrying contacts for either the high beam or low beam headlamps, is replaced by a contact control part which is displaceable longitudinally of the free arm of a U-shaped spring, and which spring is now formed without this undulated bulge. The contact control part has a dove tail guide embracing the free leg of the leaf spring, and is formed with a cam and with a cross bar or arm extending perpendicular to the dove tail guide. The cross bar or arm is bifurcated or U-shaped, including a pair of spaced legs whose spacing is correlated with the diameter of the shaft on which the control and switch cams are secured. This provision has the effect that the cam of the contact control part, mounted on the contact spring, is always exactly at the level of the shaft on which the switch and control cams are mounted.

An additional feature is that the square trip cam is provided on each edge surface with at least one notch to improve the switching functions of the switch. The distance of these notches from the edge surface bearing on the leaf spring carrying the abutment is equal to the height of the control surface of the pawl-shaped extension or abutment.

A further feature of the invention improvement is the provision of a fixed support in the switch base for the free end of the control arm when the latter is in its rest position, this fixed support thus positioning the control arm correctly for the initial switching position. Due to the several features of the invention, there is an improvement with respect to adjustment, assembly and operation of the switch.

Accordingly, an object of the present invention is to provide a switch of the type described above and which is free of shortcomings and disadvantages characteristic of prior art constructions.

Another object of the invention is to provide a switch assembly of the type described above and in which the necessity for extremely careful assembly and installation is eliminated.

A further object of the present invention is to provide a switch assembly of the type described in which the tolerance requirements for mass production are reduced.

Yet, another object of the present invention is to provide a steering column mounted switch assembly of the type described in which accurate assembly and adjustment of the various switch parts can be made prior to assembly of the switch assembly into the steering column housing.

A further object of the present invention is to provide, in a steering column mounted switch of the type described, an improved contact control part cooperable with an associated contact control cam.

Yet another object of the present invention is to provide, in a steering column mounted switch assembly of the type described, an improved construction of the trip or switching cam for cooperation with an associated leaf spring or control arm.

A further object of the invention is to provide, in a steering column mounted switch of the type described, a support surface for the free end of the switch operating leaf spring in the rest position of the latter and maintaining the latter, in its rest position, properly oriented for correct operation of the switch.

Brief description of the drawings

For an understanding of the principles of the present invention, reference is made to the following description of a typical embodiment thereof as illustrated in the accompanying drawings.

In the drawings:

FIG. 2 is a partial side elevation view, partly in section, of the switch assembly, looking from the left of FIG. 1;

FIG. 3 is a view illustrating the contacts of the switch in an intermediate position when switching from high beam to low beam or vice versa;

FIG. 4 is an elevation view, partly in section, illustrating the switch parts as assembled on the base plate, and in the one position;

FIG. 5 is a view similar to FIG. 4 but illustrating a slight modification and with the switch parts in the off position;

FIG. 6 is an elevation view of a U-shaped contact spring carrying the contact control part of the invention and which control part is engaged with the shaft mounting the trip and control cams; and FIG. 7 is a perspective view, partly in section of the contact control part embodying the invention.

Description of the preferred embodiment

Figure 1:
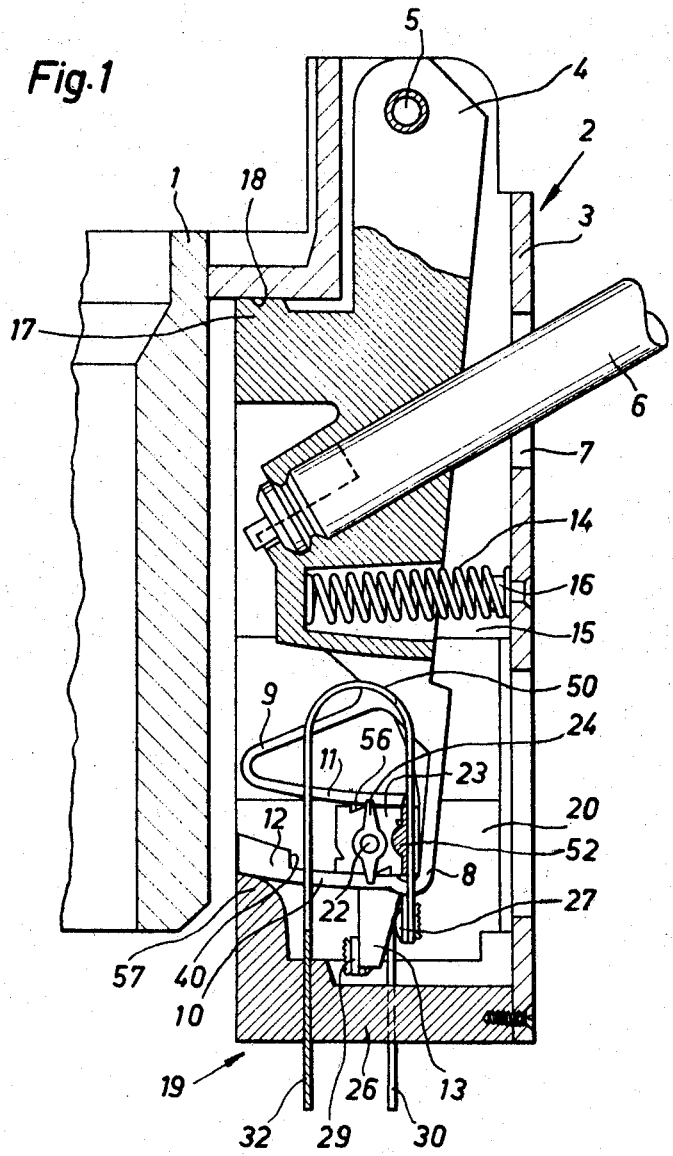
FIG. 1 is a longitudinal sectional view of a switch assembly embodying the invention.

Referring first to FIG. 1 of the drawings, a switch assembly 2 embodying the invention is arranged to be mounted on a steering column 1 for oscillation of an operating lever about an axis to signal a projected change in the direction of the vehicle. Switch assembly 2 includes a housing 3 in which there is mounted a control part or operating member 4, member 4 being mounted for pivoting about a transverse shaft 5. Approximately midway of the length of operating member 4, an operating lever 6 is secured thereto and extends through an opening 7 of housing 3, the outer end of lever 6 being adjacent the steering wheel ring. The free end of control or operating member 4 has molded integrally therewith two straps in the form of leaf springs, one of these being the control arm 8 and the other being the holding arm 9. The respective legs 10 and 11 of these straps are elastic and extend parallel to each other in opposite directions of motion of operating member 4.

The free end 12 of control arm 8 is pawl-shaped, and has a control surface or abutment 40 extending perpendicularly from one surface of leg 10 and toward leg 11. A control nose or finger 13 extends perpendicularly to the leg 10 from the opposite surface thereof. A compression spring 14 has one end engaged in a blind hole 15 in control or operating member 4, and its opposite end seating over a bolt, pin, or rivet 16 secured in a wall of housing 3. Spring 14 biases control or operating member 4 in a clockwise direction to engage an extension 17 of member 4 with a bearing surface 18 of housing 3.

A U-shaped switch base 19 is mounted in the lower part of switch housing 3, and has opposite walls 20 and 21 which rotatably mount a shaft 22, all as best shown in FIG. 2. A trip cam 23 is fixed substantially centrally of shaft 22, trip cam 23 being a square cam, as best seen in FIG. 1. On opposite sides of trip cam 23, there are secured control cams 24 and 25, respectively, these cams being fixed to rotate with shaft 22 and thus with trip cam 23. Each edge surface of trip cam 23 has formed therein at least one notch 56, whose spacing from the adjacent edge surface bearing on leg 10 of control arm 8 corresponds to the height of control surface 40 of the pawl-shaped extension 12. Switch base 19 is further provided with a support 57 engageable by the pawl-shaped end 12 of control arm 8 in the rest position of the latter, so that control arm 8 is always held in the correct initial switching position.

As best seen in FIGS. 1, 2, 4 and 5, a pair of U-shaped contact springs 50 and 51 are mounted in switch base 26, these springs extending as parallel legs from a stem or the like 32 constituting an electric lead connected to the headlamps on-off switch. The contact springs 50 and 51 each include a free leg which extends downwardly, and contacts 27 and 28, respectively, are secured in the free ends of these free legs. Each contact 27 and 28 is cooperable with a contact spring 30 or 31, respectively. One contact spring 30 or 31 is the lead for the high beam or bright headlamps, and the other is the lead for the low beam headlamps or the dim lights. A further lead 33 extends through base 19 and bypasses the headlamps on-off switch, lead 33 including an additional contact 29 selectively engageable with the contact spring 31 for the high beam or bright headlamps. This contact 29 is in the form of a spring arm which normally is bisaed, by nose or finger 13, out of engagement with the contact 31.

In acordance with an important feature of the invention, the free leg of each U-shaped contact spring 50 and 51 has movably mounted thereon a contact control part or element 52. This control element 52 is more clearly shown in FIGS. 1 and 4 through 7 and, as will be seen therein, is formed on one surface with a dove tail guide groove 53 for engagement with the free leg of a U-shaped contact spring 50 or 51. A cam 54, which extends transversely of the associated contact spring, projects from the opposite surface of part 52, and part 52 also has a projecting bifurcated arm 55 projecting from this opposite surface. Cam 54 projects into the range of operation of the associated control cam 24 or 25. The cross bar or arm 55 has its legs spaced sufficiently to embrace shaft 22, the spacing of these legs of cross bar 55 being of the order of the diameter of shaft 22. Alternatively, these cross bar legs may embrace a control cam hub, as shown in FIG. 5.

By the use of contact control parts 52, adjustment of contact springs 50 and 51 is unnecessary since the contact control parts 52 are always directed centrally to shaft 22, due to the mobility thereof on the respective contact springs 50 and 51. This insures a satisfactory alternate switching of contacts 27 and 28 by control cams 24 and 25.

The described switch assembly operates in the following manner. Initially, one of the contact springs 50 and 51 occupies the "on" position of FIG. 4 and the other contact spring occupies the "off" position of FIG. 5. When lever 6 is moved upwardly, operating member 4 is swung counterclockwise. Nose surface 40 on leg 10 of spring 8 engages the square trip cam 23 and rotates this trip cam counterclockwise, with the upper edge of nose 40 engaging in a notch 56. Cam 23 is rotated through 90° so that the previously disengaged pair of edge surfaces thereof are now brought into engagement with the legs 10 and 11 of springs 8 and 9, respectively. Through shaft 22, this rotates the control cams 24 and 25, so that one control cam moves its associated contact spring 50 or 51 to the on position and the other control cam moves its associated contact spring 50 or 51 to the off position. Thus, the lamps are switched from bright to dim or vice versa.

If there is only a partial movement of lever 6, the leg 10 will move to the right until pawl face 40 abuts an edge surface of trip cam 23. During this movement, the hose or finger 13 will allow the contact 29 to engage the contact 31 for the bright lamps and, by this partial operation of lever 6, the bright headlamps may be flashed or "flickered" as an optical warning signal. However, with each full upward movement of lever 6, the headlamps are switched from a stable bright position to a stable dim position, or vice versa.

What is claimed is:

1. In a vehicle lamp control switch of the type including a switch base, a shaft rotatably mounted in said switch base, a trip cam secured to said shaft for rotation therewith, a pair of control cams fixed to said shaft for rotation by said trip cam and each effecting alternate engagement and disengagement of an associated pair of vehicle lamp controlling contacts, with one contact of each pair being on the free leg of a respective one of a pair of U-shaped contact springs mounted in the base and the other contact of each pair being fixedly mounted in the base, and a switch operating member operatively associated with said trip cam and operable, during each actuation, to rotate said cams an angular distance sufficient to engage one pair of contacts and disengage the other pair thereof: the improvement comprising, in combination, a pair of contact control parts each freely slidable longitudinally along a respective one of said free legs on which it is mounted, and operatively engageable by a respective control cam; and locating means on each control part, independent of the associated free leg, maintaining each control part at a location along the associated free leg in which it is accurately aligned with its associated control cam.

2. In a vehicle lamp control switch, the improvement claimed in claim 1, in which said locating means comprises means on each contact control part engaged with said shaft.

3. In a vehicle lamp control switch, the improvement claimed in claim 2, in which said last-named means comprises a bifurcated arm on each contact control part extending toward said shaft and with its legs embracing said shaft, the distance between the legs of each arm corresponding substantially to the diameter of said shaft.

4. In a vehicle lamp control switch, the improvement claimed in claim 1, in which the surface of each contact control part facing the associated control can is formed with a transversely extending protrusion engageable by the associated control cam.

5. In a vehicle lamp control switch, the improvement claimed in claim 1, in which said trip cam is a square cam having four edge surfaces; said switch operating member being mounted for swinging movement relative to said trip cam and having, at its free end, a pair of resilient leaf spring elements engaged, in the rest position of said switch operating member, with a pair of opposite edge surfaces of said square trip cam, one of said leaf spring elements constituting a cam control arm and the other of said leaf spring elements, during swinging of said switch operating member, moving along the engaged edge surface of said trip cam; and an abutment on the free end of said control arm engageable with said trip cam upon displacement of said control arm to engage and rotate said trip cam through 90°; each edge surface of said trip cam having, at a distance from a corner of said trip cam substantially equal to the height of said abutment, a transverse notch engageable with the outer edge of said abutment.

6. In a vehicle lamp control switch, the improvement claimed in claim 1, in which said trip cam is a square cam having four edge surfaces; said switch operating member having a pair of leaf spring elements which, in the rest position of said switch operating member, are engaged with respective opposite edge surfaces of said trip cam, one leaf spring element constituting a control arm and the other leaf spring element constituting a holding arm; an abutment on the free end of said control arm extending toward said holding arm; said leaf spring elements, upon actuation of said switch operating member, being displaced along the respective edge surfaces of said trip cam and said abutment engaging said trip cam and rotating the same through 90°; means biasing said switch operating member back to its rest position; and means on said base engageable with the free end of said control arm in the rest position of said switch operating member to maintain said control arm in its initial switching position.

7. In a vehicle lamp control switch, the improvement claimed in claim 1, in which said switch is a steering column mounted switch including an operating lever oscillatable to signal changes in direction, and pivotally supported in a switch housing, mounting said base, for swinging, to switch the headlamps alternately between bright and dim and to flash the headlamps as an optical signal; said lever being connected to said switch operating member and said switch operating member being swingably mounted in said housing; said trip cam being a square cam having four edge surfaces; the free end of said switch operating member having elastic switching elements engageable with respective opposite edge surfaces of said trip cam, one of said elastic switching elements comprising a control arm and the other of said elastic switching elements comprising a holding arm; said control arm having an abutment on its free end engageable with said trip cam, upon actuation of said switch operating member by said operating lever, to rotate said trip cam through 90°; said contacts being headlamp controlling contacts.

8. In a vehicle lamp control switch, the improvement claimed in claim 7, in which said means maintaining each contact control part aligned with its associated control cam comprises a bifurcated arm extending from each contact control part toward said shaft, the legs of said arm embracing said shaft and the distance between said legs of said arm being substantially equal to the diameter of said shaft; the surface of each contact control part facing the associated control cam being formed with a protrusion extending transversely thereof and aligned with the associated control cam.

9. In a vehicle lamp control switch, the improvement claimed in claim 7, in which each edge surface of said trip cam is formed, at a distance from the adjacent corner equal to the height of said abutment, with a notch engageable by said abutment.

10. In a vehicle lamp control switch, the improvement claimed in claim 7, in which said base is formed with a support engageable with said control arm in the rest position of said switch operating member to maintain said control arm in its initial switching position.

References Cited

UNITED STATES PATENTS

| | | | |
|---|---|---|---|
| 2,965,737 | 12/1960 | Lewis et al. | 200—156 |
| 3,380,753 | 4/1968 | Jordan et al. | 200—61.27 |
| 2,696,534 | 12/1954 | Mallory. | |
| 3,222,468 | 12/1965 | Vanninga. | |

ROBERT K. SCHAEFER, Primary Examiner

ROGERT A. VANDERHYE, Assistant Examiner

U.S. Cl. X.R.

200—61, 153, 156